(12) United States Patent  
Lee et al.

(10) Patent No.: US 7,095,892 B2
(45) Date of Patent: Aug. 22, 2006

(54) OBJECT-OF-INTEREST IMAGE CAPTURE

(75) Inventors: King F. Lee, Schaumburg, IL (US); Allyson J. Beuhler, Woodridge, IL (US); Bei Tang, Hoffman Estates, IL (US)

(73) Assignee: Motorola, Inc., Schaumberg, IL (US)

( * ) Notice: Subject to any disclaimer, the term of this patent is extended or adjusted under 35 U.S.C. 154(b) by 85 days.

(21) Appl. No.: 11/044,738

(22) Filed: Jan. 26, 2005

(65) Prior Publication Data

US 2006/0165288 A1 Jul. 27, 2006

(51) Int. Cl.
*G06K 9/18* (2006.01)
*G03B 15/03* (2006.01)
*G06K 9/68* (2006.01)

(52) U.S. Cl. ..................... 382/182; 396/155
(58) Field of Classification Search ............... 382/162, 382/172, 181, 182, 195, 219, 220, 276, 277; 358/509, 520; 348/169, 229.1, 234, 256, 348/364; 396/63, 65, 89, 106, 144, 155, 396/233, 324

See application file for complete search history.

(56) References Cited

U.S. PATENT DOCUMENTS

| | | | | |
|---|---|---|---|---|
| 5,099,268 A | * | 3/1992 | O'Such et al. | 396/61 |
| 5,121,155 A | * | 6/1992 | O'Such et al. | 396/61 |
| 5,130,739 A | * | 7/1992 | O'Such et al. | 396/63 |
| 5,210,566 A | | 5/1993 | Nishida | |
| 5,349,415 A | | 9/1994 | Nishida | |
| 5,880,782 A | * | 3/1999 | Koyanagi et al. | 348/364 |
| 6,351,606 B1 | * | 2/2002 | Yamazaki | 396/61 |
| 2002/0118967 A1 | * | 8/2002 | Funston | 396/155 |
| 2006/0072914 A1 | * | 4/2006 | Arai et al. | 396/106 |

FOREIGN PATENT DOCUMENTS

EP 1128316 A1 8/2001
EP 1471455 A2 10/2004

OTHER PUBLICATIONS

Shimizu, et al.: A New Algorithm For Exposure Control Based on Fuzzy Logic for Video Cameras, IEEE Transactions on Consumer Electronics, vol. 38, No. 3, Aug. 1992, pp. 617-623.
Murakami, et al.: An Exposure Control System of Video Cameras Based on Fuzzy Logic Using Color Information, IEEE, 0-7803-3645-3/96, pp. 2181-2187.

* cited by examiner

*Primary Examiner*—Amir Alavi

(57) ABSTRACT

A method and apparatus for object-of-interest image capture accomplishes the functions of capturing (120) a current image, determining (125) an object region of the object-of-interest in the current image, calculating (130) a contrast measurement of the object region, and identifying (135) the current image as having an optimized object region when an iteration measure meets a criterion. The current image is captured using a local exposure value determined from luminance readings of pixels within an object region of an object-of-interest of a previous image.

17 Claims, 3 Drawing Sheets

OBJECT-OF-INTEREST IMAGE CAPTURE

FIELD OF THE INVENTION

The present invention is in the field of image capture, and more specifically in the field of adjusting camera parameters.

BACKGROUND

Performing automatic recognition by a processing system of an object-of-interest within an image is important for many tasks, including such tasks as vehicle identification by license plate recognition. Accurate camera exposure control for a region occupied by the object-of-interest is crucial to achieving optimal object recognition in computer vision. Since the location of the object-of-interest is often not known a priori, existing exposure control algorithms generally use a global luminance of the image to set the exposure threshold, which often yields poor exposure result for the object-of-interest, especially when the scene in the image is not evenly illuminated. In some existing systems, more weight or bias is put towards a designated area of the image, such as the center of the image, where the object-of-interest may have a higher likelihood to be located. This strategy will only work when the object-of-interest is limited to a particular location by some means. In the more general case where the object-of-interest can be anywhere in the image frame, using an average of a designated area, such as the center of the image, may do more harm than good.

BRIEF DESCRIPTION OF THE DRAWINGS

Embodiments of the present invention are illustrated by way of example and not limitation in the accompanying figures, in which like references indicate similar elements, and in which.

Figure 1:
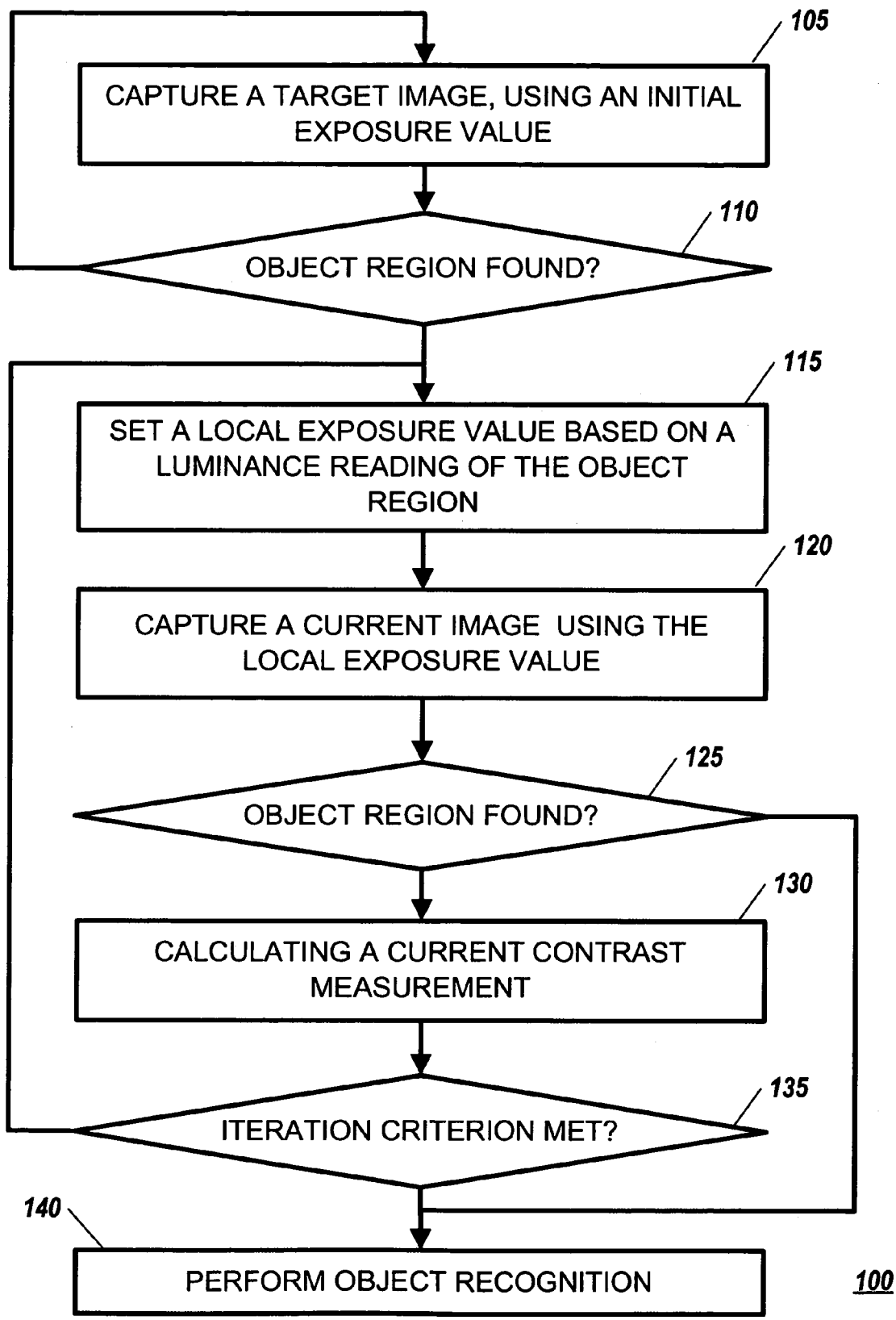
FIG. 1 is a flow chart that shows some steps of object-of-interest image capturing processes, in accordance with various embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Before describing in detail the embodiments that are in accordance with the present invention, it should be observed that the embodiments reside primarily in combinations of method steps and apparatus components related to image capture. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

It will also be understood that the terms and expressions used herein have the ordinary meaning as is accorded to such terms and expressions with respect to their corresponding respective areas of inquiry and study except where specific meanings have otherwise been set forth herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

A "set" as used in this document, means a non-empty set (i.e., comprising at least one member). The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

Referring to FIG. 1, a flow chart 100 shows some steps of object-of-interest image capturing processes, in accordance with various embodiments of the present invention. The object-of-interest image capturing processes optimize an object region within a captured image of a sequence of captured images. The object region includes an object-of-interest. At step 105, a target image is captured using a camera set to an initial exposure value. The initial exposure value may be determined from a global luminance of the target image based on luminance values generated by essentially all of the pixels in the image, a technique known to those of ordinary skill in the art. Other techniques may be used. For example, luminance values of a defined subset of all of the pixels in the image, such as a large central portion of the image, could be used. At step 110, the target image is processed to determine whether there is a region within the image that is likely to contain an object-of-interest. The processing may be done using a variety of known or new techniques. For example, known edge enhancement techniques may be combined with known line determination techniques and known geometric techniques to determine whether the image likely includes an image of an object that is rectangular, even when the plane of the rectangular object shape is not perpendicular to the central axis of the field of view of the camera. When such an object-of-interest is determined to have an appropriate likelihood of being in the target image, an object region that includes the object-of-interest is identified by boundaries within the target image.

The boundaries are determined essentially by the same techniques used to identify the likely occurrence of the object-of-interest within the target image. When an object region is determined not to occur within the target image at step 110, the image capture process continues by proceeding to step 105 and capturing a new target image. In some embodiments, the images are successive frames of a series of video frames taken at a periodic rate. In some embodiments the object-of-interest is an object that includes characters and symbols, such as alphanumeric characters and symbols.

When an object region is found to occur within the target image at step 110, a local exposure value is determined at step 115 from luminance readings of essentially all pixels within that object region, in which case the local exposure value may be determined as a local average luminance of that object region. Determining a local average luminance of an object region means that luminance values of essentially all the pixels within the boundaries of the object region are averaged to determine the local exposure value. When a local exposure value (also called the "current" or "new" local exposure value) has been determined at step 115, a new image, also termed a current image, is captured at step 120 by the camera using the local exposure value, which has been determined from a previous image. At step 125, a determination is made as to whether the current image includes an object region of the object-of-interest. Again, this may be done using known or new techniques, which may be the same as those used in step 110. When an object region is not found at step 125, then object recognition may be performed in some embodiments, at step 140, using the most recently captured image in which an object region of the object-of-interest was found. In some embodiments, step 140 is not used. For example, the object region may simply be printed or presented on a display for purposes such as human interpretation.

When an object region is found at step 125, a contrast measurement may be performed, at step 130. In some embodiments the contrast measurement is a sum of absolute differences of luminance values between adjacent pixels for essentially all of the pixels within the object region. "Essentially all of the pixels" means that a small portion of the pixels may be excluded. For example, known dead pixels could be excluded. The contrast measurement may be determined in a number or ways, including, but not limited to equations 1–4 listed below, each of which may defines a sum of absolute differences (SAD):

$$SAD_1 = \beta_1 \left( \sum_m \sum_n |l_{(m,n)} - l_{(m,n+1)}| + \sum_m \sum_n |l_{(m,n)} - l_{(m+1,n)}| \right) \quad \text{[Equation 1]}$$

$$SAD_2 = \beta_2 \sum_m \sum_n |l_{(m,n)} - l_{(m+1,n+1)}| \forall\, m, n \in OR \quad \text{[Equation 2]}$$

$$SAD_3 = \beta_3 \sum_m \sum_n |l_{(m,n)} - l_{(m,n+1)}| \forall\, m, n \in OR \quad \text{[Equation 3]}$$

$$SAD_4 = \beta_4 \sum_m \sum_n |l_{(m,n)} - l_{(m+1,n)}| \forall\, m, n \in OR \quad \text{[Equation 4]}$$

wherein
OR is "object region"
m and n are indices of the pixels within the OR included in the measurement,
l is a luminance reading generated by a pixel that was captured in an image using the local exposure value, and
$\beta_{1\text{-}4}$ are scaling factors.

At step 135, a determination is made as to whether an iteration measure meets criterion. When the criterion is met, the current image is identified at step 135 as having an optimized object region and object recognition may be performed at step 140 using the current image. As noted above, the current image may be used in some embodiments for other purposes.

The criterion used in some embodiments at step 135 may be that the current contrast measurement is greater than a most recent contrast measurement for an object region of the same object-of-interest by an established value or the criterion may be that the current contrast measurement is greater than an established value. In other embodiments, the criterion may be that the local exposure value is different from a previous local exposure value by less than an established value. In some embodiments, the previous local exposure value is a local exposure value from the most recent iteration of the loop (comprising steps 115–135) before the current iteration of the loop. In some embodiments a maximum number of iterations is also specified which, when reached, causes the criterion to be met whether or not another criterion is met. Other criteria could be used that are similar to existing optimization criteria.

At step 135, when the criterion is not met, step 115 is again performed. When step 115 is performed following step 135, the local exposure value may be determined in a manner designed to improve the contrast measurement of the object region that occurs in step 130 after a current image is captured in step 120 using the local exposure value that has been newly determined in step 135. One example of a manner designed to improve the contrast measurement is one that sets a local exposure value based on a sum of absolute differences of luminance readings of adjacent pixels for essentially all pixels within the object region. Several such manners of setting a local exposure value are defined by $$x_{k+1} = x_k + \alpha \nabla SAD_y \quad \text{[Equation 5]}$$

wherein
OR is "object region"
$x_k$ is the previous local exposure value
$x_{k+1}$ is the new local exposure value
$SAD_y$ identifies an SAD value, such as those defined by equations 1–4 above,
$\alpha$ is a scaling factor, and
$\nabla$ is the gradient operator.

Figure 2:
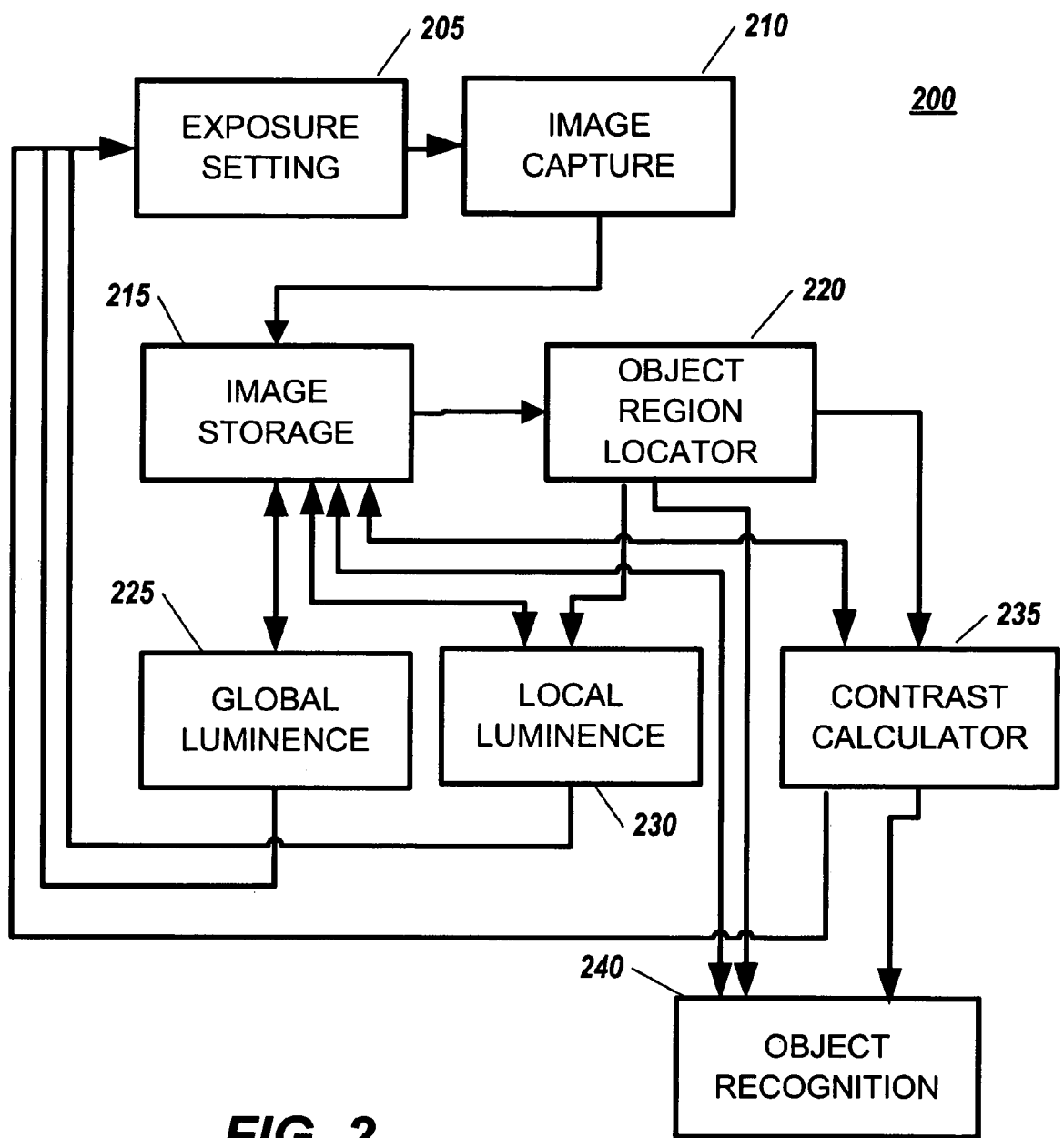
FIG. 2 is a block diagram of an apparatus used to capture an image of an object-of-interest, in accordance with some embodiments of the present invention.

Referring to FIG. 2, a block diagram is shown of an apparatus 200 used to capture an image of an object-of-interest, in accordance with some embodiments of the present invention. The apparatus 200 comprise a means 205 for setting an exposure value of a camera (such as a portion of an application specific integrated circuit (ASIC), a camera 210 (such as a visible light or infrared camera), an image storage means 215 (one example of which is a random access memory), a means 220 for locating an object region (such as a processor running appropriate programs or an ASIC or portion thereof), a global luminance determination means 225 (such as a processor running appropriate programs or an ASIC or portion thereof), a local luminance determination means 230 (such as a processor running appropriate programs or an ASIC or portion thereof), a contrast calculator 235 (such as a processor running appropriate programs or an ASIC or a portion thereof), and an object recognition means 240 (such as a processor running appropriate programs or an ASIC or a portion thereof).

The means 205 for setting an exposure value of a camera 210 operates to set an exposure value as described with reference to steps 105 and 115 described with reference to FIG. 1. As used in this document, the camera 210 is also referred to as a means to capture an image. The exposure values are coupled to the camera 210 to set the exposure of the camera 210. The camera 210 captures an image that is stored in image storage means 215. The object region locator means 220, the global luminance determination means 225, the local luminance determination means 230, the contrast calculator means 235, and the object recognition means 240 are coupled to the image storage means 215. The object region locator means 220 searches an image stored in the image storage means 215, and when one is found, couples the boundary information to the local luminance determination means 230, the contrast calculator means 235, and the object recognition means 240. When an initial image is being obtained, the means 205 for setting an exposure value of a camera 210 responds to a global luminance value determined by the global luminance determination means 225 to capture a target image. Then the means 205 for setting an exposure value of a camera 210 responds to a local luminance value determined by the local luminance determination means 230 from the object region to capture a current image, which is analyzed by the contrast calculator means 235 to determine whether the contrast of the object region meets the criterion described above with reference to FIG. 1. When the criterion is not met, the contrast calculator means 235 determines a next local exposure value that is coupled to the means 205 for setting an exposure value of a camera 210. When the criterion is met, the contrast calculator means 235 informs the object recognition means 240, which performs object recognition of the object region identified by the object region locator means 220.

Equation 5 (above) defines a next local exposure value to use based on a current local exposure value and a determination of how the sum of absolute differences is changing at the current local exposure value. Other approaches for iterating the local exposure value in a manner to improve the contrast of a next captured object region are known to those of ordinary skill in the art.

Figure 3:
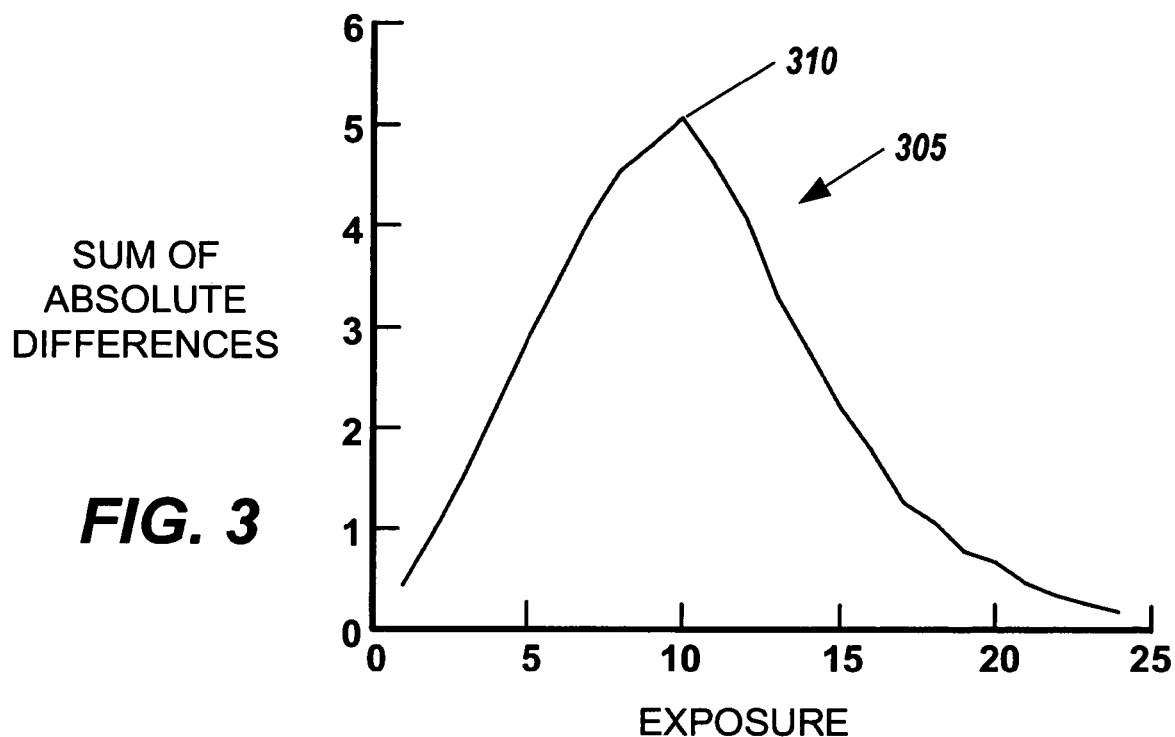
FIG. 3, a graph shows a plot of a series of contrast calculations performed for a particular object-of-interest at different exposures, in accordance with an embodiment of the present invention.
Figure 4:
FIGS. 4–6 are illustrations of the object region of video frames that include an object-of-interest that is a license plate at three exposure values, in accordance with some embodiments of the present invention.
Figure 5:
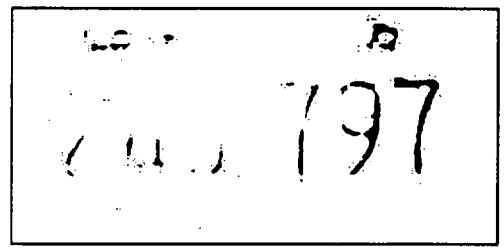
Figure 6:

Referring to FIG. 3, a graph shows a plot 305 of a series of contrast calculations performed for a particular object-of-interest at different exposures, in accordance with an embodiment of the present invention. In this embodiment, the object-of-interest is an automotive license plate located on the rear of a car. The car was recorded by a video camera. The frame in which the license plate is captured is substantially larger than the license plate; the license plate occupies generally less than $\frac{1}{10}^{th}$ of each frame and is generally not in the center of the frames. It will be appreciated that using any exposure control technique based upon luminance characteristics of the entire image would not provide the object region improvements demonstrated by the embodiments of the present invention. In this embodiment, the contrast calculations (made at step 130 of FIG. 1) are made using a sum of absolute differences of luminance values generated by adjacent pixels within the object region of a license plate, under ambient light conditions that are essentially static within the time duration of interest. The formula is given in equation 1, above. It can be seen from the plot that at low and high exposures, the result of the calculation is near zero. This corresponds to object regions that appear, respectively, as nearly all black or nearly all white images, as illustrated in FIGS. 4 and 5, which are illustrations showing the approximate appearance of the object regions for frames are substantially under exposed and overexposed, respectively. It will be observed that the plot 305 has one peak value 310. This is a general characteristic of this formula under normal conditions, such as non-changing ambient light, and is an advantage for using this measure of contrast. This measure also has a characteristic of producing an image, when the peak exposure value is used, that is excellent for performing character recognition within the object region, which is one desirable use of embodiments of the present invention. An illustration showing the approximate appearance of the object region captured using an exposure value near the peak of the sum of absolute differences for this license plate, using an embodiment described herein with reference to FIGS. 1 and 2 is shown in FIG. 6.

By using the means and processes described herein, it will be appreciated that an image is captured that has contrast optimized specifically in the object region of the image. When the object-of-interest is one that includes characters and symbols, it will be appreciated that an automated object recognition performed on the object region will provide better results than previous techniques and systems. The optimized image capture may be performed by an electronic device that may be a digital video camera or a digital still camera.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method for object-of-interest image capture, comprising:
    capturing a current image using a local exposure value determined from luminance readings of pixels within an object region of an object-of-interest of a previous image;
    determining an object region of the object-of-interest in the current image;
    calculating a contrast measurement of the object region; and
    identifying the current image as having an optimized object region when an iteration measure meets a criterion wherein the local exposure value is determined from a sum of absolute differences (SAD) of luminance readings of adjacent pixels within the object region.

2. The method according to claim 1, further comprising:
    determining an object region of the object-of-interest within a target image captured using an initial exposure value; and
    setting the local exposure value based on luminance readings of pixels within the object region.

3. The method according to claim 2, wherein the initial exposure value is determined from a global luminance of the target image.

4. The method according to claim 1, further comprising: performing object recognition of a character based object using the optimized object region.

5. The method according to claim 1, wherein the local exposure value is determined from a local average luminance of the object region.

6. The method according to claim 1, wherein the local exposure value is determined in a manner designed to improve the contrast measurement of the object region in an image captured using the local exposure value so determined.

7. The method according to claim 1, wherein the local exposure value is determined by:

$$x_{k+1} = x_k + \alpha \nabla \left( \sum_m \sum_n |l_{(m,n)} - l_{(m,n+1)}| + \sum_m \sum_n |l_{(m,n)} - l_{(m+1,n)}| \right) \forall\, m, n \in OR$$

wherein
OR is "object region"
$x_k$ is a previous local exposure value
$x_{k+1}$ is the local exposure value
m and n are indices of the pixels within the OR included in the measurement,
l is a luminance reading generated by a pixel that was captured in a previous image using a previous local exposure value $x_k$,
$\alpha$ is a scaling factor, and
$\nabla$ is a gradient operator.

8. The method according to claim 1, wherein the contrast measurement is a sum of absolute differences of luminance values of adjacent pixels, for essentially all pixels within the object region.

9. The method according to claim 1, wherein the criterion is that the contrast measurement is greater than an established value.

10. The method according to claim 1, wherein the criterion is that the current contrast measurement is greater than a contrast measurement made using a previous object region of a previous image, by an established value.

11. The method according to claim 1, wherein the criterion is that the local exposure value is different from a previous local exposure value by less than an established value.

12. The method according to claim 1, wherein the criterion includes that a number of iterations has reached a maximum value.

13. The method according to claim 1, wherein the current image is a current frame of a series of periodic video frames.

14. The method according to claim 1, wherein the object-of-interest substantially comprises characters.

15. The method according to claim 1, further comprising, when the contrast measurement fails to meet the criterion:
setting a local exposure value; and
repeating the capturing of a current image, the determining of the object region, and the calculating of a contrast measurement.

16. A means for object-of-interest image capture, comprising:
a means for capturing a current image;
a means for setting an exposure value that determines a local exposure value from a local luminance reading of pixels within an object region of an object-of-interest of a previous image;
a means for local luminance determination that generates the local luminance reading;
a means for locating the object region of the object-of-interest in the current image; and
a means for calculating a contrast measurement of the object region and identifying the current image as having an optimized object region when an iteration measure meets a criterion wherein the local exposure value is determined from a sum of absolute differences (SAD) of luminance readings of adjacent pixels within the object region.

17. An electronic device for object-of-interest image capture, comprising:
an electronic device for capturing a current image; and
a processing function that includes
an exposure value setting function that determines a local exposure value from a local luminance reading of pixels within an object region of an object-of-interest of a previous image;
a local luminance determination function that generates the local luminance reading;
a locating function that locates the object region of the object-of-interest in the current image; and
a calculation function that calculates a contrast measurement of the object region and identifying the current image as having an optimized object region when an iteration measure meets a criterion wherein the local exposure value is determined from a sum of absolute differences (SAD) of luminance readings of adjacent pixels within the object region.

* * * * *